(12) United States Patent
Savir et al.

(10) Patent No.: US 11,249,944 B2
(45) Date of Patent: Feb. 15, 2022

(54) ANOMALY-BASED RETENTION POLICIES FOR SNAPSHOT-BASED DATA PROTECTION SYSTEMS

(71) Applicant: EMC IP Holding Company LLC, Hopkinton, MA (US)

(72) Inventors: Amihai Savir, Sansana (IL); Avitan Gefen, Lehavim (IL); Kfir Wolfson, Beer Sheva (IL); Itay Azaria, Dimona (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 277 days.

(21) Appl. No.: 16/654,635

(22) Filed: Oct. 16, 2019

(65) Prior Publication Data

US 2021/0117377 A1  Apr. 22, 2021

(51) Int. Cl.
| | |
|---|---|
| G06F 17/00 | (2019.01) |
| G06F 16/11 | (2019.01) |
| G06N 7/00 | (2006.01) |
| G06N 20/00 | (2019.01) |
| G06F 16/178 | (2019.01) |

(52) U.S. Cl.
CPC .......... *G06F 16/125* (2019.01); *G06F 16/128* (2019.01); *G06F 16/178* (2019.01); *G06N 7/00* (2013.01); *G06N 20/00* (2019.01)

(58) Field of Classification Search
CPC .... G06F 16/125; G06F 16/128; G06F 16/178; G06N 7/00; G06N 7/005; G06N 20/00; G06N 20/10
See application file for complete search history.

(56) References Cited

U.S. PATENT DOCUMENTS

| | | | | |
|---|---|---|---|---|
| 8,204,859 | B2 * | 6/2012 | Ngo | G06F 16/27 707/639 |
| 9,582,382 | B1 * | 2/2017 | Natanzon | G06F 11/1446 |
| 10,218,741 | B2 * | 2/2019 | Gopalakrishna | G06F 21/53 |
| 10,983,951 | B1 * | 4/2021 | Kuang | G06F 16/2365 |
| 11,050,770 | B2 * | 6/2021 | Nanda | H04L 63/0263 |
| 2019/0228296 | A1 * | 7/2019 | Gefen | G06F 11/079 |
| 2020/0356442 | A1 * | 11/2020 | Agarwal | G06F 16/9027 |

OTHER PUBLICATIONS

Sudhir Jorwekar, Alan Fekete, Krithi Ramamritham, and S. Sudarshan. Automating the detection of snapshot isolation anomalies. In Proceedings of the 33rd international conference on Very large data bases, VLDB Endowment, 1263-1274, Sep. 2007.*

(Continued)

*Primary Examiner* — Greta L Robinson
(74) *Attorney, Agent, or Firm* — Workman Nydegger (57) ABSTRACT

One example method includes monitoring performance of an element of a runtime environment, where the monitoring includes collecting performance information concerning the element, analyzing the collected information, detecting, based on the analysis of the collected information, an anomaly in the performance of the element and, in response to detection of the anomaly, automatically marking a snapshot of the runtime environment element, and the marking of the snapshot overrides a retention policy applicable to the snapshot.

20 Claims, 5 Drawing Sheets

(56) References Cited

OTHER PUBLICATIONS

Mark Thober, J. Aaron Pendergrass, and Andrew D. Jurik. JMF: Java measurement framework: language-supported runtime integrity measurement. In Proceedings of the seventh ACM workshop on Scalable trusted computing (STC '12). Association for Computing Machinery, 21-32, Oct. 2012.*

Aggarwal, "Outlier Analysis", 2013, Springer Science+Business Media New York, pp. 1-456.

Chatfield, "The Analysis of Time Series: An Introduction, Sixth Edition", 2003 (version date: Mar. 16, 2016), Chapman & Hall/CRC, Texts in Statistical Science, pp. 1-48.

* cited by examiner

ANOMALY-BASED RETENTION POLICIES FOR SNAPSHOT-BASED DATA PROTECTION SYSTEMS

FIELD OF THE INVENTION

Embodiments of the present invention generally relate to data protection. More particularly, at least some embodiments of the invention relate to systems, hardware, software, computer-readable media, and methods for implementing and/or modifying retention policies for one or more specific snapshots, based on detection of an anomaly in the computing environment.

BACKGROUND

In recognition of the need to protect important data, a tiered retention policy can be implemented in snapshot-based replication scenarios and environments. In one example, new snapshots are saved at relatively short intervals, such as one snapshot every hour, while older snapshots are consolidated and saved at longer intervals, such as one snapshot per day for snapshots older than 24 hours so that at the end of a 24 hour period, only the most recent snapshot for that period is saved and the other 23 earlier snapshots are discarded. This approach allows for low Recovery Point Object (RPO) and can save disk space by reducing the resolution for older snapshots.

This approach presents challenges, however, in circumstances where, for example, data corruption or unintentional data deletion occur. In such circumstances, several hours, or more, of work may be lost if the problem is detected late. That is, the most up to date snapshot that was taken before the problem occurred may have already been deleted according to a snapshot policy. Thus, rollback to an older snapshot may be required, which would result in a loss of any work that was done between the time that the most up to date snapshot was deleted and the time that the older snapshot was taken.

The situation is even more problematic where the problem is not detected until well after it has occurred. Due to the passage of time, numerous snapshots that were taken before the problem occurred, and which may have been good rollback candidates or targets, may have already been deleted, thus resulting in the loss of a significant amount of work.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods for implementing and/or modifying retention policies for one or more specific snapshots, based on detection of an anomaly in the computing environment.

In general, example embodiments of the invention embrace, among other things, anomaly detection methods and processes that may monitor a computing environment and recommend and/or automatically adjust the retention policy of specific snapshots based on detection of the anomaly. Embodiments of the invention may track one or more Key Performance Indicators (KPIs) to identify the occurrence of an anomaly. Additionally, or alternatively, embodiments of the invention may operate in connection with the output of one or more agents that monitor events/logs for KPIs. Example KPIs that may be monitored in connection with various embodiments of the invention include, but are not limited to: ransomware detection; OS updates; dropped tables from a database or application; a stream of OS events, including failures and non-failure events such as the Windows Events (obtained through use of the Windows Event Viewer which shows a log of application and system messages, including errors, information messages, and warnings); antivirus events in which the presence of a virus has been identified; changes to one or more specific directories and/or other portions of a filesystem; application-specific events, which may be defined, by a user and/or computing system, specifically for a protected application; user-defined and entered KPIs; OS changes; system driver failure, even if the failure does not necessarily crash the machine; outages in network traffic; manual modifications done to specific tracked files, such as configuration files for example; security breaches and unauthorized logins; and, any combination of any of the foregoing. Still other KPIs that may be employed in embodiments of the invention may include VM statistics that may be obtained, for example, from a hypervisor or external monitor such as the VMware vCenter Server, or VMware Log Insight in VMware environments. These VM statistics include, but are not limited to, CPU usage, network usage, storage usage in terms of IOPs and/or throughput, and memory usage.

It should be noted that while embodiments are well suited for use in connection with applications running on virtual machines, the scope of the invention is not so limited. Thus, embodiments of the invention may be employed in connection with computing elements of other runtime environments such as, but not limited to, physical servers, and containers, for example.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a link may be established between a data protection system that generates snapshots, and an update system that operates to update applications and operating systems (OSs) according to a schedule. An embodiment of the invention may operate, automatically in some cases, to track multiple different KPIs as part of a process to detect and identify an anomaly. An embodiment of the invention may employ the detection of an anomaly as a basis to mark, automatically in some cases, one or more snapshots as important and worthy of retention for a period exceeding, or a period that is otherwise different from, a retention period dictated for the snapshot(s) by a snapshot schedule or some other basis. An embodiment of the invention may mark and/or unmark, automatically in some cases, one or more snapshots based upon changing conditions in a computing environment. An embodiment of the invention may operate on an as-needed, rather than continuous, basis to identify anomalies and/or mark/unmark snapshots. An embodiment of the invention may, but need not, operate in real time. An embodiment of the invention may reduce data loss and/or enable a more rapid recovery from an event than would be the case if the monitoring and marking processes disclosed herein were not employed. An embodiment of the invention may employ a machine learning process to refine and improve one or more aspects of the disclosed methods. An embodiment of the invention may use a machine learning process to automatically choose the retention policy of snapshots based on the state of the computing environment. An embodiment of the invention may allow recovery of applications and/or VMs protected with snapshot-based replication solutions to much closer point in time to incidents, reducing data loss and time to recovery.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection and data restore operations. Such operations may include, but are not limited to, data read/write/delete operations, data deduplication operations, data backup operations, data restore operations, data snapshot operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in backup platforms, examples of which include the Dell-EMC NetWorker and Avamar platforms and associated backup software, and storage environments such as the Dell-EMC DataDomain storage environment and PowerProtect functionality. In general, however, the scope of the invention is not limited to any particular data backup platform or data storage environment. As well, some embodiments may be employed in connection with snapshot-based replication solutions such as "DR to the cloud" using Dell EMC RecoverPoint for VMs or Cloud-DR PowerProtect and Avamar plugins which save snapshots, such as VM snapshots for example, to the AWS S3 object store.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 1:
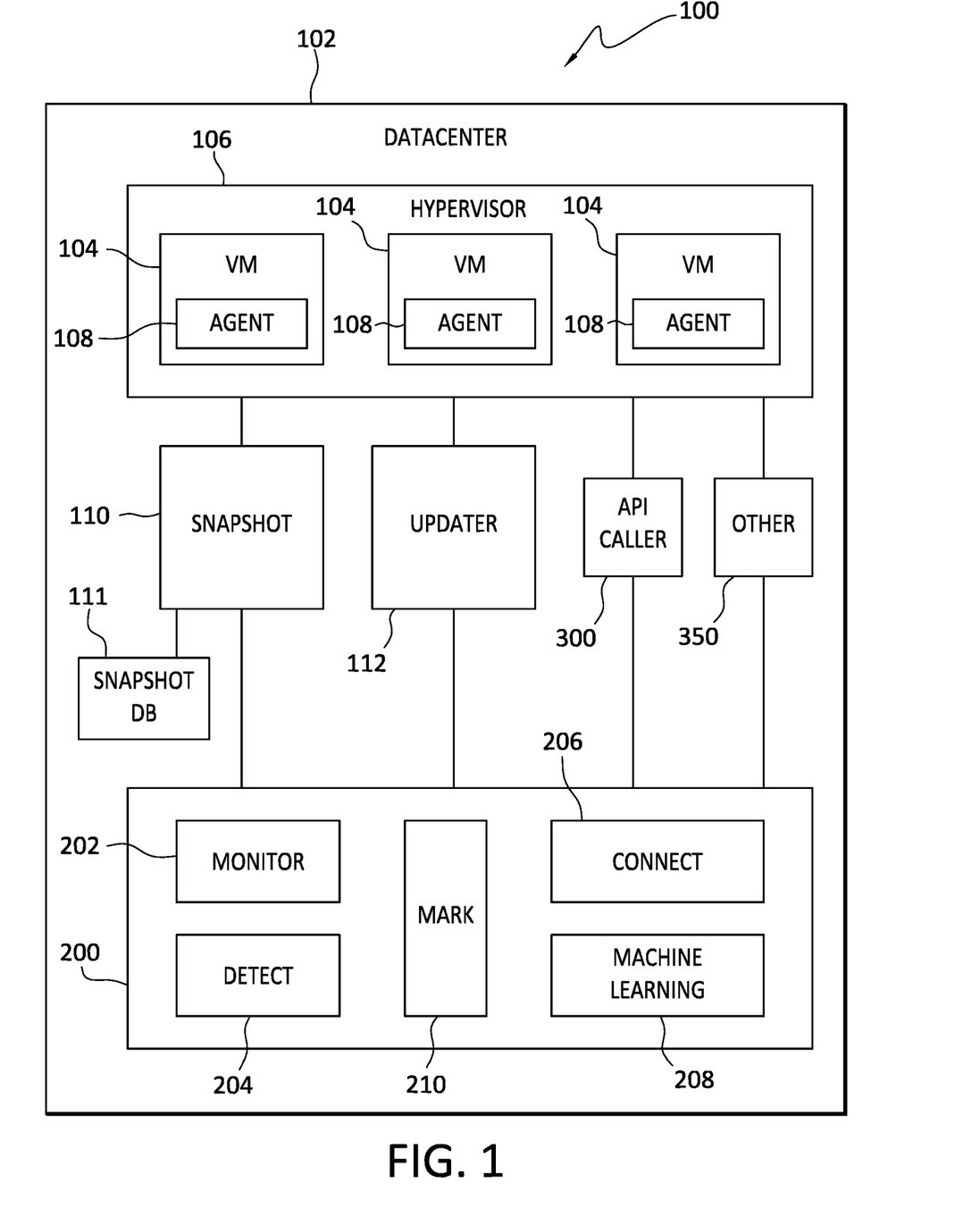
FIG. 1 discloses aspects of an example operating environment for an embodiment of the invention.

With particular attention now to FIG. 1, one example of an operating environment for embodiments of the invention is denoted generally at 100. In general, the operating environment 100 may comprise, or consist of, a datacenter 102, which may be a cloud datacenter, on-premises datacenter, or other type of datacenter. The datacenter 102 may include one or more VMs 104 running on a hypervisor 106. One or more of the VMs 104 may include applications that run on the VMs 104 to serve the needs of users and clients (not shown). One or more of the VMs 104 may also include databases and other components. In the example of FIG. 1, the VMs 104 may each include an agent 108 that may operate to monitor the VM 104 and/or associated applications and collect various information concerning the VM 104 and/or applications including, but not limited to, data and time-dependent attributes. The agent 108 is not required, however, and in some embodiments may be omitted from the VM 104. In this case, the VM 104 and/or application information may be collected by another entity.

The example operating environment 100 may also include a snapshot module 110 and an updater module 112. The snapshot module 110 may take snapshots, for example, of one or more VMs 104. The snapshots may be taken by the snapshot module 110 according to a predetermined schedule and/or on any other basis, including an ad-hoc basis. To this end, the snapshot module 110 may communicate, and coordinate, with the hypervisor 106 on which the VMs 104 are running. The snapshot module 110 is a particular example implementation of a data protection system. The snapshot module 110 may communicate with a snapshot database (DB) 111 that stores one or more snapshots. In some embodiments, snapshot operations such as, but not limited to, snapshot marking/unmarking/deleting are performed in the snapshot DB 111. The snapshot DB 111 in which the snapshots are stored may reside in a cloud storage environment such as Amazon S3, or the other cloud storage environments disclosed herein. Or the snapshot DB 111 may be part of the data protection system, and only connect to the Amazon S3 storage to perform the actual deletion of snaps. Marking can be done solely inside the DB, for instance. As these examples illustrate, no particular arrangement of the snapshot DB 111 or snapshots is required.

An update module 112 may also be provided that implements processes such as automatically updating an OS and/or applications on one or more of the VMs 104. As such, the updater module 112 may communicate such updates to the hypervisor 106 for implementation on the VMs 104 to be updated.

Another element of example embodiments of the operating environment 100 is a retention policy engine 200. The retention policy engine 200 may, but need not necessarily, be an element of the datacenter 102. Regardless of its location, the retention policy engine 200 may communicate with the snapshot module 110 and updater module 112. The example retention policy engine 200 may include various elements such as, for example, a monitoring module 202, detection module 204, connection module 206, machine learning module 208, and a marking module 210. It should be noted that the aforementioned modules are shown separately for the sake of discussion, but the functionalities associated with any of the modules may be combined with the functionalities associated with any of the other modules. Thus, the functional allocation disclosed in FIG. 1 is provided only by way of example.

With respect to the various example components of the retention policy engine 200, the monitoring module 202 may, in general, monitor the performance and operation of one or more of the VMs 104 and/or the application(s) running on those VMs to obtain data that may be evaluated by the detection module 204 for identification of any anomalies. The monitoring module 202 may additionally, or alternatively, obtain information about the VMs 104 and/or associated applications from an API caller 300 that periodically calls the API(s) of the protected application(s) running on the VMs 104. The monitoring module 202 may additionally, or alternatively, obtain such information from various other sources 350, one example of which is an external threat notifier such as an antivirus application.

As noted, the detection module 204, which may or may not be an element of the machine learning module 208, or vice versa, may receive VM behavior information and/or application behavior information gathered by the monitoring module 202 and then evaluate that information to determine if anomalies are present in, and/or suggested by, that information. The connection module 206 may enable and/or facilitate communication between any of the modules of the retention policy engine 200, including the monitoring module 202, and any of the other components disclosed in, and/or implied by, FIG. 1. For example, the connection module 206 may operate to connect the retention policy engine 200 with the snapshot module 110.

The evaluation operations may be performed in connection with the machine learning module 208 which may be operable to recognize the occurrence of various events that may be used as a basis for marking, by the marking module 210, one or more snapshot(s). In more detail, the information obtained by the monitoring module 202 may be used as a basis for generating a machine learning (ML) model that may be implemented as the machine learning module 208, and that may operate to detect events such as, but not limited to, OS updates, dropping of tables from a database, and ransomware operation. More generally, events monitored and/or evaluated may include, among others, any event concerning the installation of, updating of, and/or operation of, any application and/or VM. Further details concerning the example retention policy engine 200 are disclosed elsewhere herein.

C. Example Host and Server Configurations

Figure 2:
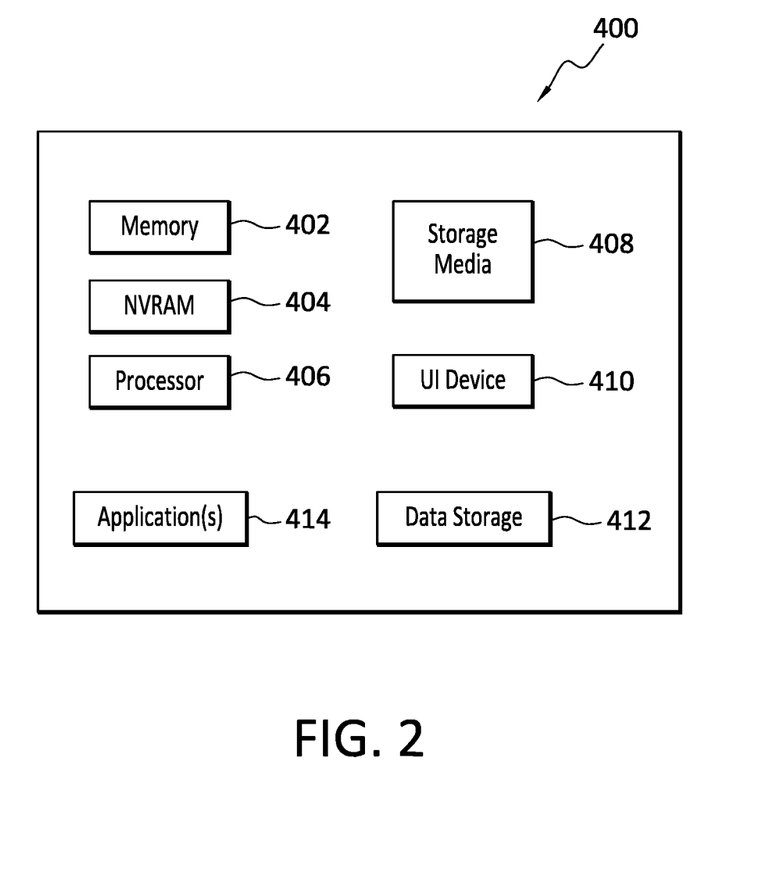
FIG. 2 discloses aspects of an example host device.

With reference briefly now to FIG. 2, any one or more of the entities disclosed, or implied, by FIG. 1 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 2.

In the example of FIG. 2, the physical computing device 400 includes a memory 402 which may include one, some, or all, of random access memory (RAM), non-volatile random access memory (NVRAM) 404, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to anomaly detection, behavior monitoring, machine learning, marking and unmarking, updating, KPI tracking, snapshot creation and other backup processes, data collection, analytics, evaluation, time series analysis, and any combination of these.

D. Example Issues Addressed by Some Embodiments

In general, one or more embodiments of the invention may be effective in avoiding, or resolving, various problems or issues. Following is a discussion of some example circumstances in which embodiments of the invention may be usefully employed.

Embodiments of the invention may connect an upgrading system or updater with a data protection system. This approach may be useful in circumstances where updates to a VM OS or application, for example, are performed automatically and not controlled by a user. By connecting the updater with the data protection system, embodiments of the invention may mark as important a snapshot taken just prior to the update. In this way, if a problem occurs with the update, the VM or application can be rolled back to a relatively recent snapshot, which has been retained due to having been marked as important, without a significant loss of information. Thus, an important snapshot is retained, at least for a period of time, that may otherwise have been deleted in accordance with an automatically set retention policy. In effect then, the default or initial retention policy in this case is overridden.

Embodiments of the invention may use a machine learning module for anomaly detection that enables relatively faster detection of anomalies that have occurred in the system. As such, those embodiments may avoid the problems that could arise if application/VM issues are detected after a relatively long period of time, such as 1-2 days for example, has passed. In such cases, the snapshots from the time of issue might be at a low resolution, such as one per day, and significant information would be lost if the application or VM was rolled back using the low resolution snapshot.

For example, if an issue were detected a few days after it occurred, the previous snapshot might be almost 24 hours before. Recovering to that point in time would mean a loss of an entire day of data. This data might be important, for example, even if the issue occurred earlier, as there may be more than one application on a VM, or the issue might be in the OS or a virus, and it would be desirable to recover to a point prior to when the issue began.

By reducing detection times, the relevant snapshot may be marked as important, and problems caused by the detected issue avoided. That is, some embodiments may enable rollback to a relatively more recent snapshot than would otherwise be the case, thus reducing data and information loss that would be associated with rollback to an older snapshot.

Embodiments of the invention may automatically mark a snapshot that is taken just prior to the implementation of significant changes in the system, since such changes may result in problems. This may be particularly useful where those changes take place within a relatively short timeframe. For example, special events, such as OS updates, or dropping tables from a DB, occur in a short timeframe but could have a large impact on the system. A failure of the system at such times could require complicated and long procedures to restore the state of the system. By marking as important, a snapshot taken prior to such changes, embodiments of the invention provide for preservation of an up to date snapshot to which the VM or application may be rolled back if a problem occurs during the system changes. In this way, the restoration process may be made relatively simpler, and faster, than if rollback to an older snapshot were implemented.

E. Snapshot Overview

As noted herein, embodiments of the invention may be employed in connection with a snapshot process in which snapshots of a VM, and/or applications running on that VM, are created. Following is a discussion of various aspects of some example snapshot processes in connection with which some embodiments of the invention may be employed. Note that embodiments of the invention are not limited to use with snapshots but may be employed with the other data protection operations disclosed herein.

In snapshot-based replication, the snapshot interval refers to the amount of time between successive snapshots of, for example, an application or VM. The snapshot interval sets the RPO. For example, if the snapshot interval is set to 1 hour, the latest point in time to recover to will be at most one hour old. The snapshot interval also affects the recoverability of the application from previous points in time. When recovering to a point in time older than the latest, the resolution of the snapshots is set by this interval.

Snapshots may be organized or categorized, according to a retention policy, into tiers. Example tiers may include: (i) hourly snapshots for the latest 24 hours; (ii) daily snapshots for 7 days; and (iii) weekly snapshots for 28 days. In this example, snapshots older than 28 days are deleted. If all snapshots are full snapshots of the application and/or VM, then implementing the tiers may be performed by deleting the frequent snapshots and leaving just a defined number of snapshots. In the aforementioned example then, for snapshots older than 24 hours, 23 of the 24 hourly snapshots may be deleted, and just one snapshot from that day, or 24 hour period, may be retained. The retained snapshot for the day in question may be referred to as the daily snapshot. For snapshots older than a week, only 1 of the daily snapshots per week will be retained. In systems with incremental snapshots, snapshot consolidation methods may be used to combine the data between incremental snapshots.

In some embodiments, a user may manually mark specific snapshots as important and those snapshots will not be consolidated or deleted, although as noted herein, embodiments of the invention may provide for systems and methods that implement, among other things, automatic marking of one or more snapshots, and thus eliminate the need for any manual marking by a user. In the preceding example, such snapshots may be saved for the whole protection window of 28 days, or optionally longer, according to user preference. One possible use case is for the user to apply this approach to snapshots taken before an upgrade of the application, update of the OS, deleting large amounts of data, or other processes.

F. Aspects of Some Example Embodiments

Following is a discussion of some aspects of example embodiments of the invention. It should be noted that the following are presented by way of example and are not intended to limit the scope of the invention.

In general, example embodiments embrace a system and methods that perform various functions, which functions may include monitoring a protected application/VM for various events and key performance indicators (KPIs), detecting anomalies in the application/VM behavior, where the detection may be implemented after an initial learning phase, and connecting to a data protection system and marking snapshots as "important," if/when one or more anomalies is/are detected by the system.

Note that some embodiments may employ a binary approach to marking in which a snapshot is either marked as "important," or is not marked at all. Other approaches may be employed however. For example, rather than affirmatively marking a snapshot, embodiments of the invention may simply set, or reset, as applicable, a retention time for one or more snapshots, based upon the nature and timing of a detected anomaly and also, in some embodiments, based upon a threat level associated with the anomaly. For example, if a problem such as a virus is quickly identified, the retention time of a snapshot taken prior to occurrence of the problem may be relatively short since the VM may be rolled back to that snapshot relatively soon after the problem occurred. Once the rollback is complete, it may not be necessary to continue to retain that snapshot. Thus, as used herein, "marking" is intended to be broad in scope and embraces any method, process, or operation, that serves to change, either directly or indirectly, a retention time associated with a particular snapshot.

With regard to anomaly detection, the system and processes may be refined to reduce the number of false-positives. This may be achieved, for example, by setting thresholds to a particular confidence level that an anomaly has occurred. If the threshold value, for example, is met or exceeded, a preceding snapshot, which may or may not be the most recent snapshot taken prior to occurrence of the anomaly, may be marked as important, such that the marked snapshot may be retained for a longer/different period than may otherwise be dictated by a default snapshot retention policy.

Embodiments of the invention may support the designation and use of maximums, such that no more than X snapshots will be marked as "important" in a specified time period, such as one day for example. Additionally, or alternatively, some embodiments may identify, and remove, any marking for snapshots of at least a certain age, such as snapshots that are older than one week for example. This approach may help to balance the cost of storage consumed by the various snapshot tiers with the need for keeping important snapshots. Embodiments of the invention may allow for accepting inputs from the user, and feedback, to improve future snapshot marking decisions.

As noted, embodiments of the invention enable the marking of particular snapshots as "important," such that the marked snapshot may be retained for a retention period that is different from, such as longer than and/or terminating at a different time than, a default retention period specified by a retention policy for example. In some embodiments, it may be useful to unmark a marked snapshot. By changing a previous marking decision, the system may be able to optimize the snapshots that it marks. More specifically, when it becomes apparent that a snapshot other than the marked snapshot may be a better rollback candidate, the marked snapshot may be unmarked, and the previously unmarked snapshot marked. In this way, the system may respond to changing conditions in the computing environment. The following examples are illustrative.

It may be decided that a particular system may mark as important only one snapshot per day. Thus, if this system were to decide, for example, that an anomaly that occurred at 3 pm is more important than an anomaly that occurred at 12 pm, then the system may decide to unmark the snapshot that was taken prior to the 12 pm anomaly and mark the snapshot that was taken closer to 3 pm.

Another example of changing previous decisions is where, if the system were to receive an indication from an external system that everything with the protected application/VM is normal at a certain time period, then the system may unmark a snapshot that the system had previously marked as important. The previously marked snapshot may have been marked in anticipation of potential problems that might occur with an OS update performed after the marked snapshot was taken and marked, but once it has been determined that the updated OS is functioning normally, there is no need to retain the marking on the snapshot. Such changes may only be relevant for the latest point in time snapshot(s), and older snapshots may not be affected or marked/unmarked.

In terms of performance of the disclosed processes, embodiments of the invention do not necessarily have to operate in real time, although some embodiments may do so in some instances. For example, an embodiment of the invention may detect an anomaly that happened a few hours ago, and then mark important snapshots in retrospect. This means that the evaluation of data gathered concerning the computing environment may be performed in the cloud for instance, in an on-demand basis and does not have to run all the time. This approach may have cost benefits. For example, the analysis may run only once per day, and the system may mark snapshots from the last 24 hours, if needed. By running the analysis, and marking snapshots, only once per day, processing resources may be conserved, thus reducing costs for the VM owner or other user.

One example of where doing the work, such as analysis and/or marking offline and asynchronous, may result in cost savings involves the use of Amazon Web Services (AWS) Spot Instances. These Spot Instances are VMs that can be rented for a limited amount of time and may thus provide good value. In some cases, at least, Spot Instances may be available when the cloud VM-running infrastructure has excess capacity.

It was noted earlier that embodiments of the invention may comprise, consist of, or employ, a machine learning module and associated functionality. Among other things, the machine learning functionality may adapt and learn from similar protected applications and/or VMs in the same environment or other installations, so the learning curve for the machine learning module may be shorter for known applications/VMs. Thus, a need for a cold start approach, in which the machine learning module has to learn each VM and/or application from scratch, may be avoided. The following discussion provides further details concerning the structure, implementation, and operation, of a system that includes a machine learning module and machine learning process such as may be employed in embodiments of the invention.

In general, and as noted in the discussion of FIG. 1 for example, embodiments of the system may perform data collection processes which may involve monitoring of one or more protected applications/VMs, and collecting data and time dependent attributes from various sources, such as an agent running on the VM, statistics from the hypervisor running the VM, a program that periodically calls the protected application's API, and external threat notifiers such as antiviruses. The collected data and attributes may be used to general an ML model that is operable to recognize events and anomalies such as, but not limited to, OS updates, dropping tables, and ransomware operation.

The machine learning module, one example of which is the machine learning module 208, that implements the ML model may include an analytic engine, some embodiments of which may have two primary components, namely, a time series model and a Gaussian Mixture Model (GMM) that learns the VM normal state and may then alert on observations that diverge from the learned pattern or state. More specifically, the GMM may be created and/or obtained by calculating a multi-dimensional probability distribution function describing the VM profile, with each dimension of the probability distribution function capturing the pattern in some respective monitored feature.

In this regard, embodiments of the invention may take account of the fact that in some circumstances at least, it may not be adequate to monitor only a single event type. Particularly, reliance on tracking only one event type or KPI may be too limited in scope to reliably capture and identify complicated events and anomalies. For example, a KPI in the form of an update to the OS of VM might affect the behavior of a VM application, which eventually drops a table. Thus, simply tracking the OS updates as a KPI, without also tracking VM application performance as a KPI, may not give a complete picture of what took place in the system. Thus, capturing and evaluating not just one, but several different, metrics may provide relatively better insight into system behavior, events, and anomalies.

In addition to tracking KPIs, information about the relationships between or among multiple KPIs may also be tracked by embodiments of the invention. Thus, in the preceding example, there is a relationship between the OS update KPI and the VM application performance KPI. Likewise, and as suggested by the foregoing example, particular combinations of two or more KPIs may be tracked.

With continued reference to the analytic engine, any time series model may be selected to track the normal behavior of each KPI. Examples of such time series models include, but are not limited to, regression models, and autoregressive integrated moving average (ARIMA) models. It should be noted that some embodiments may not analyze all of the data collected concerning VMs, applications, and the computing environment. For example, in some instances, it may be possible to identify anomalies of interest by analyzing only about 10 percent of the collected data. Of course, more, or less, data may be analyzed in other circumstances.

In the following example, the Holt-Winters model of time series is employed due to its relative simplicity, and because it may be relatively easy to update the model in an online manner. This example model may fundamentally track three components of the signal, namely, level, bias and seasonality. Generally, the model uses the following time-series equations:

$$\text{Level } L_t = \gamma(Y_t - S_{t-s}) + (1-\gamma)(L_{t-1} + B_{t-1}) \tag{1}$$

$$\text{Bias } B_t = \beta(L_t - L_{t-1}) + (1-\beta)B_{t-1} \tag{2}$$

$$\text{Seasonality } S_t = \gamma(Y_t - L_t) + (1-\gamma)S_{t-s} \tag{3}$$

$$\text{Forecast } F_{t+k} = L_t + kB_t + S_{t+k-s} \tag{4}$$

where $Y_t$ is the actual value at time t, and s is the length of the seasonal cycle. Further detailed description and analysis of the above equations may be found in "*The Analysis of Time Series: An Introduction,*" 6th Edition, Chris Chatfield, CRC Press, 19 Nov. 2013.

The time series are presented to a streaming mechanism, which calculates the residuals:

$$r_{t+k} = F_{t+k} - Y_{t+k} \tag{5}$$

Figure 3:
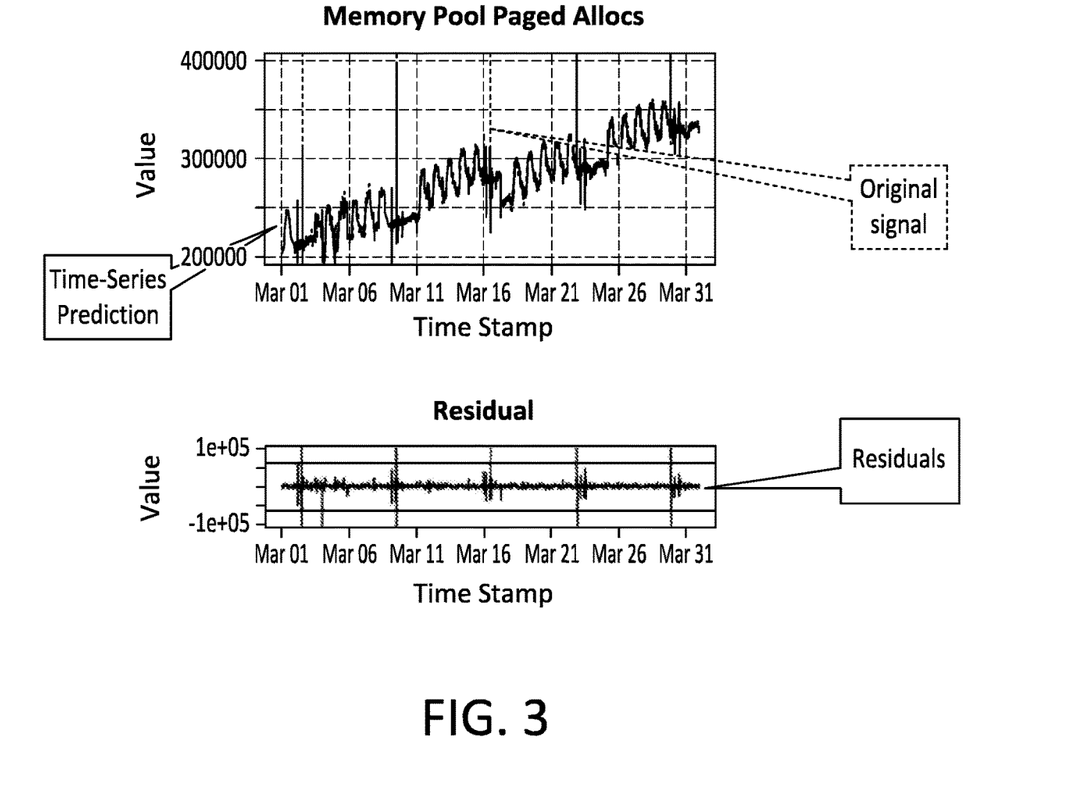
FIG. 3 discloses example plots of a time series prediction and associated residuals.

As indicated in the example of FIG. 3, the result may be plotted to show where the actuals behave very differently from the model. For example, residuals may be initially computed and stored for 3 weeks to form the historical residual data. With particular reference to FIG. 3, the top figure illustrates a fit of the Holt-Winters model, denoted at "Time-Series Prediction" on top of the original signal denoted at "Original Signal." The bottom figure in FIG. 3 indicates the residual signal, denoted "Residual," found by subtracting the general, periodic and cyclic trends (upper and lower horizontal lines) from the "Original Signal" depicted in the top graph.

Figure 4:
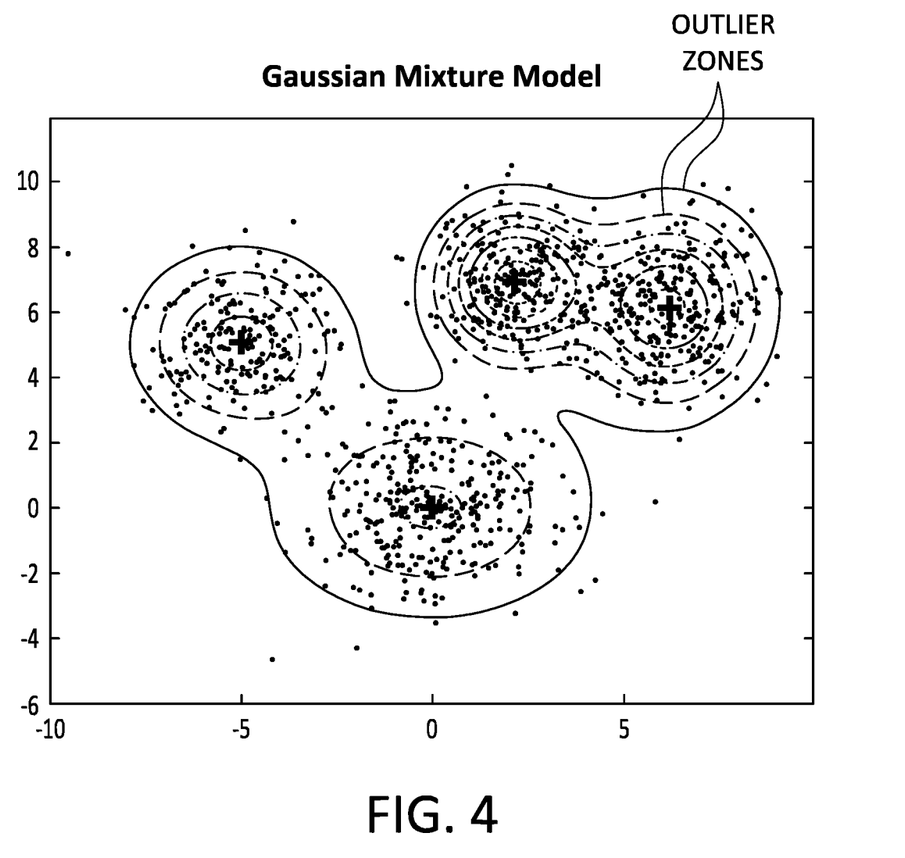
FIG. 4 discloses an example plot of a Multivariate Gaussian Mixture Model (GMM).

With reference now to FIG. 4, details are provided concerning GMM and Residual Distribution Fitting. Particularly, to tie together all the residuals obtained from the time series analysis, a kernel distribution function such as the Multivariate Gaussian Mixture Model (GMM) can be used. If it is assumed, for example, that there are d KPIs being monitored, then a multivariate GMM with p components fit to the residuals would take the form:

$$f(r) = \sum_{j=1}^{p} w_j N\left(\mu_j, \sum_j\right), \tag{6}$$

where each $N(\mu_j, \Sigma_j)$ is a d-dimensional multivariate normal distribution with average vector $\mu_j$ and covariance matrix $\Sigma_j$, and the $w_j$ are the model's mixture proportions.

The set of parameters for the multivariate GMM, $\Phi = (w_1, \ldots, w_p, \mu_1, \ldots, \mu_p, \Sigma_1, \Sigma_p)$, can be estimated using an Expectation-Maximization (EM) algorithm on the historical residual data obtained from the time series analysis, with a model selection criterion such as Akaike Information Criterion (AIC) or Bayesian Information Criterion (BIC)

used to determine the number of mixture components p. More information on the use of mixture models for outlier detection can be found, for example, in "*Outlier Analysis,*" 1st Edition, Charu C. Aggarwal, Springer New York, 2013.

As indicated in FIG. 4, a Gaussian Mixture Model (GMM) for modeling the environment is disclosed. The underlying probability distribution spans multiple dimension, that is, monitored low-level features, and has several centers of masses, each of which corresponds to a respective mode of activity. For example, an environment that is being monitored may have various modes, one or more of which may be designated as normal operating modes. Such normal modes may include, for example, a daytime mode, and a nighttime mode. In this example, the environment may operate differently at night than during the day, but both modes are simply alternative normal modes in this case.

With continued reference to the particular example of FIG. 4, it can be seen that there are three different centers of mass, each denoted by a cross. Each center of mass may represent a respective normal mode for the environment or KPI under consideration. Further, each center of mass is surrounded by groupings of values or activities, each denoted as a dot, and whose relative normality is based on a distance from the dot to the relevant center of mass. Thus, dots relatively far from the center of mass reside in what are denoted as outlier zones, and such dots are the least normal, or most abnormal, of the values or activities in the particular grouping of values or activities of which they are a part. On the other hand, dots relatively close to a center of mass correspond to activities or values that are relatively normal, as compared to dots in the outlier zones for example.

G. Aspects of Some Example Methods

Figure 5:
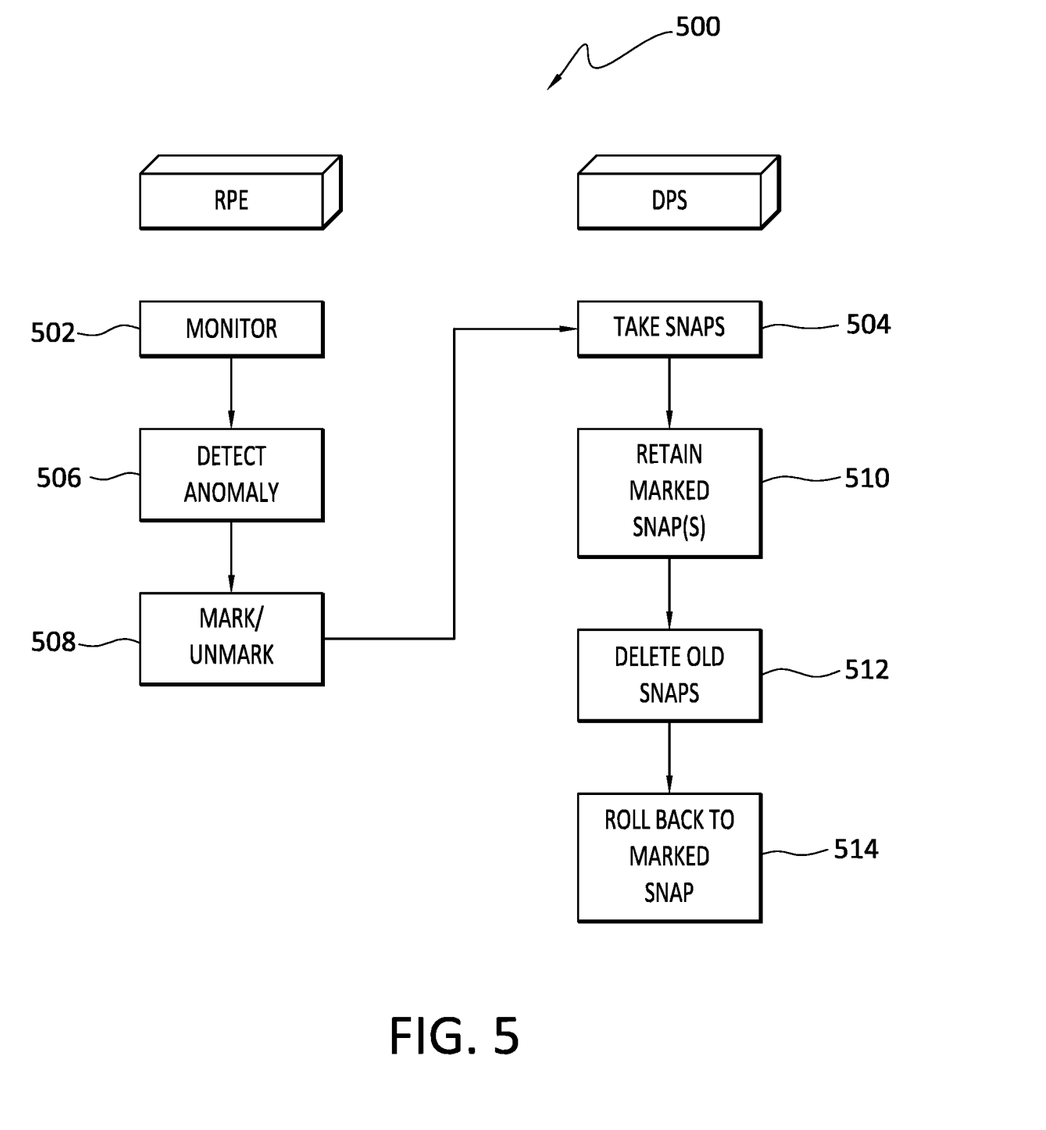
FIG. 5 discloses aspects of an example method.

With reference now to FIG. 5, details are provided concerning methods for implementing an anomaly-based retention policy for a data protection system, such as a snapshot based data protection system for example. One example of such a method is denoted generally at 500. The example method 500 may be performed, either in whole or in part, by a retention policy engine, an example of which is discussed herein in connection with FIG. 1. The retention policy engine may cooperate with a data protection system, which may include a snapshot module for example, in performance of some or all of the method 500. More generally, however, performance of the method 500 is not limited to any particular entity or group of entities. As well, the method 500 may be performed, either in whole or in part, at a datacenter, but embodiments of the invention may be implemented in other environments as well.

The example method 500 may begin at 502 with the monitoring of the performance of one or more elements of a computing environment, where such elements may include, for example, one or more VMs, one or more applications that may be hosted on one or more VMs. Such elements may also include any other elements that operate in runtime environments such as, but not limited to, physical servers, and containers, for example. The monitoring process 502 may include the collection of performance data concerning those elements. The monitoring process 502 may comprise monitoring of one or more KPIs relating to performance of one or more elements of the computing environment.

As the performance of the elements is being monitored 502, a data protection system may be automatically taking snapshots 504, and/or other backups, of the monitored elements according to a snapshot protocol. Some example snapshot protocols, and associated retention policies, are disclosed elsewhere herein.

The data obtained in connection with the monitoring process 502 may be analyzed, and such analysis may result in the detection 506 of one or more anomalies in the performance of the monitored elements. The detection 506 of an anomaly may trigger the marking and/or unmarking 508 of one or more snapshots. The marking/unmarking 508 may be performed automatically, or manually by a user in response to a prompt generated by the retention policy engine. The snapshot that is marked 508, for example, may be the last snapshot taken prior to when the anomaly was determined to have occurred. Additionally, or alternatively, one or more snapshots other than the last snapshot prior to the anomaly may be marked. In some instances, one or more snapshots may be marked in anticipation of an event, such as an application or OS update, for example, that may be expected to cause a performance problem.

A marked snapshot may be retained 510 by the data protection system for a period of time that is longer than, and/or otherwise different from, a retention period specified by a retention policy for that marked snapshot. That is, the marking may, for the particular snapshot that has been marked, override or supersede the retention policy as that retention policy applies, or would have, to that particular snapshot. After a marked snapshot has been unmarked 508, the newly-unmarked snapshot may be deleted immediately, or may be deleted later according to a retention policy for the newly-unmarked snapshot. In some embodiments, a marked snapshot may be retained indefinitely, or retained until manually or automatically unmarked. In some embodiments, a marked snapshot may be retained for a specified length of time, or until a particular time, at which point the marked snapshot may be unmarked and/or deleted.

In addition to retaining 510 any marked snapshots, the data protection system may continue to delete 512 old, unmarked, snapshots according to a retention policy. Thus, the process 512 may be ongoing. In this regard, and as indicated by the example of the process 512, the various processes of the method 500 may be performed in various orders other than the example order shown in FIG. 5 and, as well, the performance of any of those processes may overlap in time.

As further indicated in FIG. 5, the marking 508 of a snapshot enables a computing system element, such as a VM or application for example, to be rolled back 514 to a point in time prior to when the detected anomaly 506 occurred. After the computing system element has been rolled back 514, the marked snapshot upon which the rollback was based may be unmarked, although that is not necessarily required. If/when unmarking of that snapshot occurs, the unmarked snapshot may then be subject to a retention policy that dictates when that snapshot will be deleted.

While not specifically indicated in FIG. 5, part, or all, of the example method 500 may be performed on a continuous basis. In other instances, part, or all, of the example method 500, such as anomaly detection 506 for example, may be performed on an ad-hoc basis or on-demand basis. For example, anomaly detection 506 may be performed at night, when more processing resources may be available. As another example, anomaly detection 506 may be scheduled to be performed once per day, and snapshots from the last 24 hours marked 508.

As well, at least some of the processes of the method 500 are performed at the same time or, at least, in overlapping time intervals. For example, the processes performed by the data protection system may be performed at the same time as the processes of the retention policy engine. In another example, the monitoring process 502, the snapshot process 504, and snapshot delete 512 process, may all be performed continuously. In another example, the processes of the example method 500 may, or may not, be performed in real time.

H. Further Example Embodiments

Following are some further example embodiments of the invention. These are presented only by way of example and are not intended to limit the scope of the invention in any way.

Embodiment 1

A method, comprising: monitoring performance of an element of a computing environment, and monitoring comprises collecting performance information concerning the element; analyzing the collected information; detecting, based on the analysis of the collected information, an anomaly in the performance of the element; and in response to detection of the anomaly, automatically marking a snapshot of the computing environment element, and the marking of the snapshot overrides a retention policy applicable to the snapshot.

Embodiment 2

The method as recited in embodiment 1, wherein marking of the snapshot sets a retention period for the snapshot that is longer than a retention period set for the snapshot by the retention policy.

Embodiment 3

The method as recited in any of embodiments 1-2, wherein marking of the snapshot prevents deletion of the snapshot until the snapshot is unmarked.

Embodiment 4

The method as recited in any of embodiments 1-3, wherein the snapshot is marked by a computing entity.

Embodiment 5

The method as recited in any of embodiments 1-4, wherein the element is one or more of an application, and a virtual machine.

Embodiment 6

The method as recited in any of embodiments 1-5, wherein monitoring the performance of the element comprises monitoring one or more key performance indicators relating to the performance of the element.

Embodiment 7

The method as recited in any of embodiments 1-6, wherein analyzing the collected information comprises using a time series model and a Gaussian Mixture Model (GMM) to analyze the collected information.

Embodiment 8

The method as recited in any of embodiments 1-7, wherein marking the snapshot comprises connecting to a data protection system where the snapshot is stored.

Embodiment 9

The method as recited in any of embodiments 1-8, further comprising unmarking a marked snapshot.

Embodiment 10

The method as recited in any of embodiments 1-9, further comprising using a Gaussian Mixture Model to learn a normal state for the computing system element.

Embodiment 11

The method as recited in any of embodiments 1-10, wherein the method is performed in whole or in part by a retention policy engine.

Embodiment 12

A method for performing any of the operations, methods, or processes, or any portion of any of these, disclosed herein.

Embodiment 13

A non-transitory storage medium having stored therein instructions that are executable by one or more hardware processors to perform the operations of any one or more of embodiments 1 through 12.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    monitoring performance of a computing system element of a runtime environment, and the monitoring comprises collecting performance information concerning the computing system element;
    analyzing the collected information;
    detecting, based on the analyzing of the collected information, an anomaly in the performance of the computing system element; and
    in response to the detecting of the anomaly, automatically marking a snapshot of the computing system element, and the marking of the snapshot overrides a retention policy applicable to the snapshot.

2. The method as recited in claim 1, wherein the marking of the snapshot sets a retention period for the snapshot that is longer than a retention period set for the snapshot by the retention policy.

3. The method as recited in claim 1, wherein the marking of the snapshot prevents deletion of the snapshot until the snapshot is unmarked.

4. The method as recited in claim 1, wherein the snapshot is marked by a computing entity.

5. The method as recited in claim 1, wherein the computing system element is one or more of an application, a virtual machine, a physical computing device, or a container.

6. The method as recited in claim 1, wherein the monitoring of the performance of the computing system element comprises monitoring one or more key performance indicators relating to the performance of the computing system element.

7. The method as recited in claim 1, wherein the analyzing of the collected information comprises using a time series model and a Gaussian Mixture Model (GMM) to analyze the collected information.

8. The method as recited in claim 1, wherein the marking of the snapshot comprises connecting to a data protection system where the snapshot is stored.

9. The method as recited in claim 1, further comprising unmarking a marked snapshot.

10. The method as recited in claim 1, further comprising using a Gaussian Mixture Model to learn a normal state for the computing system element.

11. A non-transitory storage medium having stored therein instructions that are executable by one or more hardware processors to perform operations comprising:
    monitoring performance of a computing system element of a runtime environment, and the monitoring comprises collecting performance information concerning the computing system element;
    analyzing the collected information;
    detecting, based on the analyzing of the collected information, an anomaly in the performance of the computing system element; and
    in response to the detecting of the anomaly, automatically marking a snapshot of the computing system element, and the marking of the snapshot overrides a retention policy applicable to the snapshot.

12. The non-transitory storage medium as recited in claim 11, wherein the marking of the snapshot sets a retention period for the snapshot that is longer than a retention period set for the snapshot by the retention policy.

13. The non-transitory storage medium as recited in claim 11, wherein the marking of the snapshot prevents deletion of the snapshot until the snapshot is unmarked.

14. The non-transitory storage medium as recited in claim 11, wherein the snapshot is marked by a computing entity.

15. The non-transitory storage medium as recited in claim 11, wherein the computing system element is one or more of an application, a virtual machine, a physical computing device, or a container.

16. The non-transitory storage medium as recited in claim 11, wherein the monitoring of the performance of the computing system element comprises monitoring one or more key performance indicators relating to the performance of the computing system element.

17. The non-transitory storage medium as recited in claim 11, wherein the analyzing of the collected information comprises using a time series model and a Gaussian Mixture Model (GMM) to analyze the collected information.

18. The non-transitory storage medium as recited in claim 11, wherein the marking of the snapshot comprises connecting to a data protection system where the snapshot is stored.

19. The non-transitory storage medium as recited in claim 11, wherein the operations further comprise unmarking a marked snapshot.

20. The non-transitory storage medium as recited in claim 1, wherein the operations further comprise using a Gaussian Mixture Model to learn a normal state for the computing system element.

* * * * *